(12) United States Patent
McMillen et al.

(10) Patent No.: US 10,358,065 B2
(45) Date of Patent: Jul. 23, 2019

(54) PNEUMATIC FOUR WAY LUMBAR

(71) Applicant: Leggett & Platt Canada Co., Halifax (CA)

(72) Inventors: Robert J. McMillen, Tecumseh (CA); Wade O'Moore, Belle River (CA); Horia Blendea, LaSalle (CA); Renato Colja, Windsor (CA); Alan C. Prettyman, Windsor (CA)

(73) Assignee: LEGGETT & PLATT CANADA CO., Halifax, Nova Scotia (CA)

( * ) Notice: Subject to any disclaimer, the term of this patent is extended or adjusted under 35 U.S.C. 154(b) by 203 days.

(21) Appl. No.: 15/390,059

(22) Filed: Dec. 23, 2016

(65) Prior Publication Data

US 2018/0178694 A1 Jun. 28, 2018

(51) Int. Cl.
*B60N 2/66* (2006.01)
*B60N 2/90* (2018.01)
*A47C 7/46* (2006.01)
*B60N 2/70* (2006.01)

(52) U.S. Cl.
CPC .............. *B60N 2/665* (2015.04); *A47C 7/467* (2013.01); *B60N 2/666* (2015.04); *B60N 2/7017* (2013.01); *B60N 2/914* (2018.02)

(58) Field of Classification Search
CPC ...... B60N 2/665; B60N 2/914; B60N 2/7017; A47C 7/467
See application file for complete search history.

(56) References Cited

U.S. PATENT DOCUMENTS

| 4,965,899 A | * | 10/1990 | Sekido | ................... B60N 2/665 297/284.6 |
|---|---|---|---|---|
| 9,090,185 B2 | | 7/2015 | McMillen | |
| 2010/0244504 A1 | | 9/2010 | Colja et al. | |
| 2014/0265506 A1 | | 9/2014 | McMillen et al. | |

FOREIGN PATENT DOCUMENTS

| EP | 2607157 A1 * | 6/2013 | ........... B60N 2/4263 |
|---|---|---|---|
| WO | 2009056304 | 5/2009 | |

OTHER PUBLICATIONS

International Search Report and Written Opinion for Application No. PCT/CA2017/000252 dated Feb. 19, 2018, 10 pages.

* cited by examiner

*Primary Examiner* — Syed A Islam
(74) *Attorney, Agent, or Firm* — Michael Best & Friedrich LLP (57) ABSTRACT

A lumbar support system for a seat backrest, the lumbar support system includes a carrier having a first end and a second end opposite the first end. The carrier is movable with respect to the seat backrest in a first direction and in a second direction opposite the first direction. The lumbar support system further includes a first bladder coupled to the first end of the carrier, a second bladder coupled to the second end of the carrier, and a third bladder coupled to the carrier. The third bladder has a contact surface and is configured to move with the carrier. The first bladder is inflatable to move the carrier in the first direction, and the second bladder is inflatable to move the carrier in the second direction. The third bladder is inflatable such that the contact surface is extendable in a third direction.

17 Claims, 10 Drawing Sheets

PNEUMATIC FOUR WAY LUMBAR

BACKGROUND

The present disclosure relates to a lumbar support system for use within a seat, specifically for use within a vehicle seat.

SUMMARY

In an embodiment of a lumbar support system for a seat backrest, the lumbar support system includes a carrier having a first end and a second end opposite the first end. The carrier is movable with respect to the seat backrest in a first direction and in a second direction opposite the first direction. The lumbar support system further includes a first bladder coupled to the first end of the carrier, a second bladder coupled to the second end of the carrier, and a third bladder coupled to the carrier. The third bladder has a contact surface and is configured to move with the carrier. The first bladder is inflatable to move the carrier in the first direction, and the second bladder is inflatable to move the carrier in the second direction. The third bladder is inflatable such that the contact surface is extendable in a third direction.

In an embodiment of a method of manufacturing a pneumatic bladder, the method includes positioning a first sheet of material adjacent to a second sheet of material, forming a bladder by welding the first sheet of material to the second sheet of material, and removing excess material surrounding the formed bladder.

In an embodiment of a lumbar support system for a seat backrest, the lumbar support system includes a lumbar support movable with respect to the seat backrest. The lumbar support system further includes a pneumatic assembly configured to provide a pressurized gas generated via an electric motor. The pressurized gas is operable to move the lumbar support in at least four different directions. The lumbar support system does not include any additional electric motors other than the electric motor configured to generate the pressurized gas.

Other aspects of the disclosure will become apparent by consideration of the detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. And as used herein and in the appended claims, the terms "upper", "lower", "top", "bottom", "front", "back", and other directional terms are not intended to require any particular orientation, but are instead used for purposes of description only.

DETAILED DESCRIPTION

Figure 1:
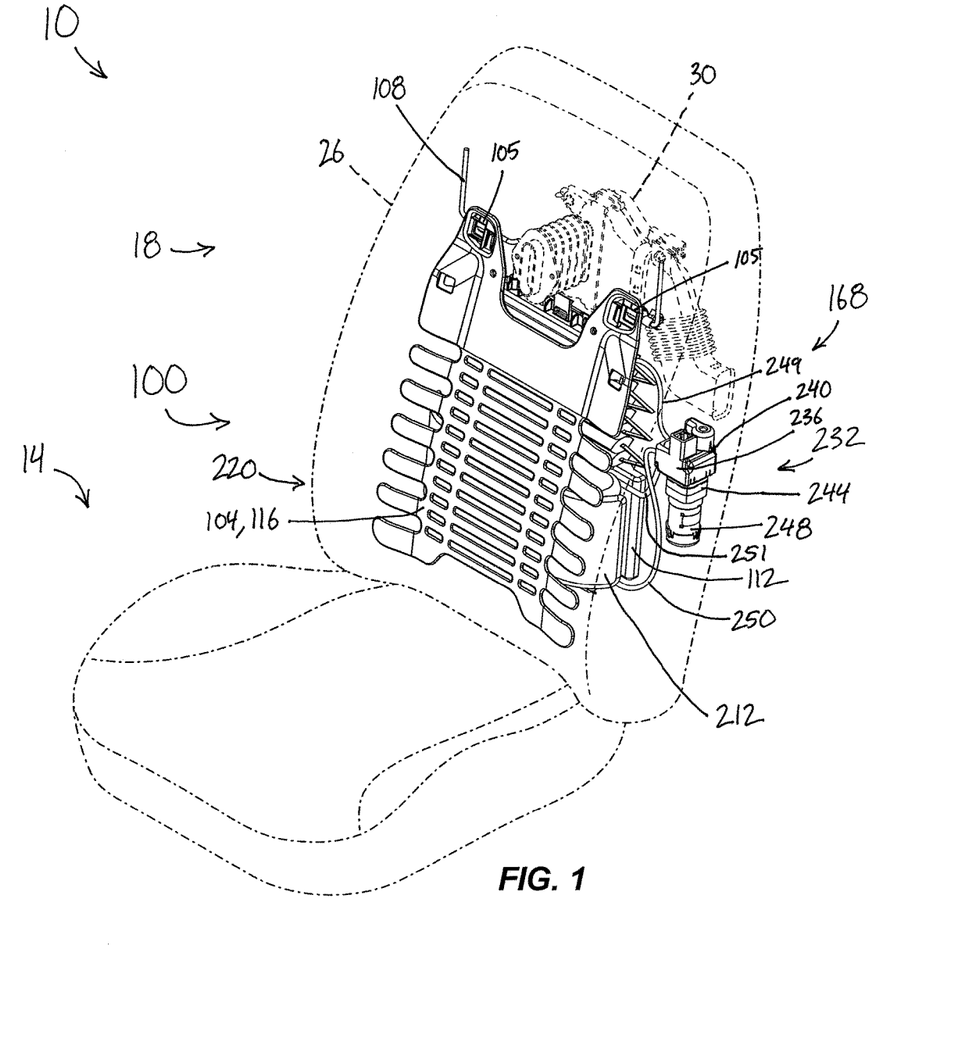
FIG. 1 is a front perspective view of a vehicle seat including a lumbar support system.

With reference to FIG. 1, a seat 10 is illustrated, which for purposes of the following description may be any vehicle seat within the passenger compartment of a vehicle, though the seat 10 is not necessarily limited to vehicular applications. The seat 10 generally includes a seat bottom 14 (shown in phantom) and a seat backrest 18 for horizontal and vertical support, respectively, of a seat occupant. The seat backrest 18 is foldable relative to the seat bottom 14 at a pivot (not shown). A frame (not shown) is covered by an overlying cushion 26 (shown in phantom), and provides structural integrity for the backrest 18. A lumbar support system 100 is coupled thereto to permit adjustable lumbar support for the seated occupant. In the illustrated embodiment, the seat 10 further includes a heating and cooling duct 30 (shown in phantom) positioned above the lumbar support system 100.

Figure 2:
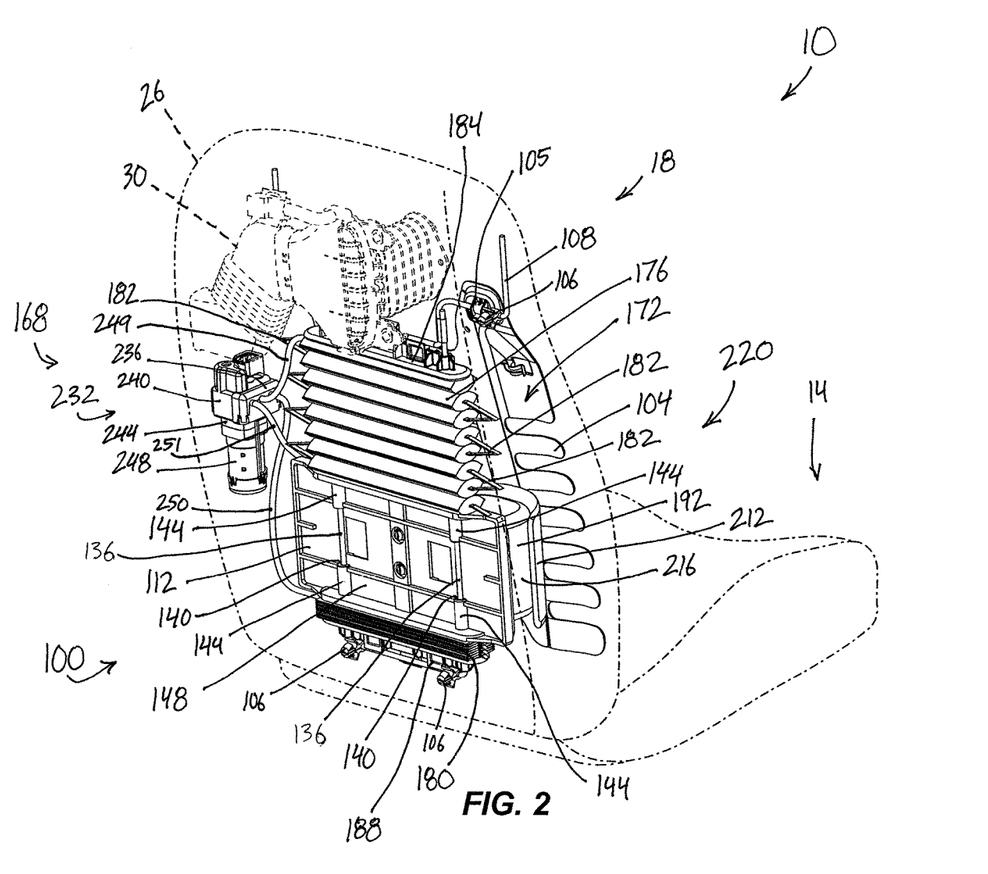
FIG. 2 is a rear perspective view of the vehicle seat and the lumbar support system of FIG. 1.
Figure 3:
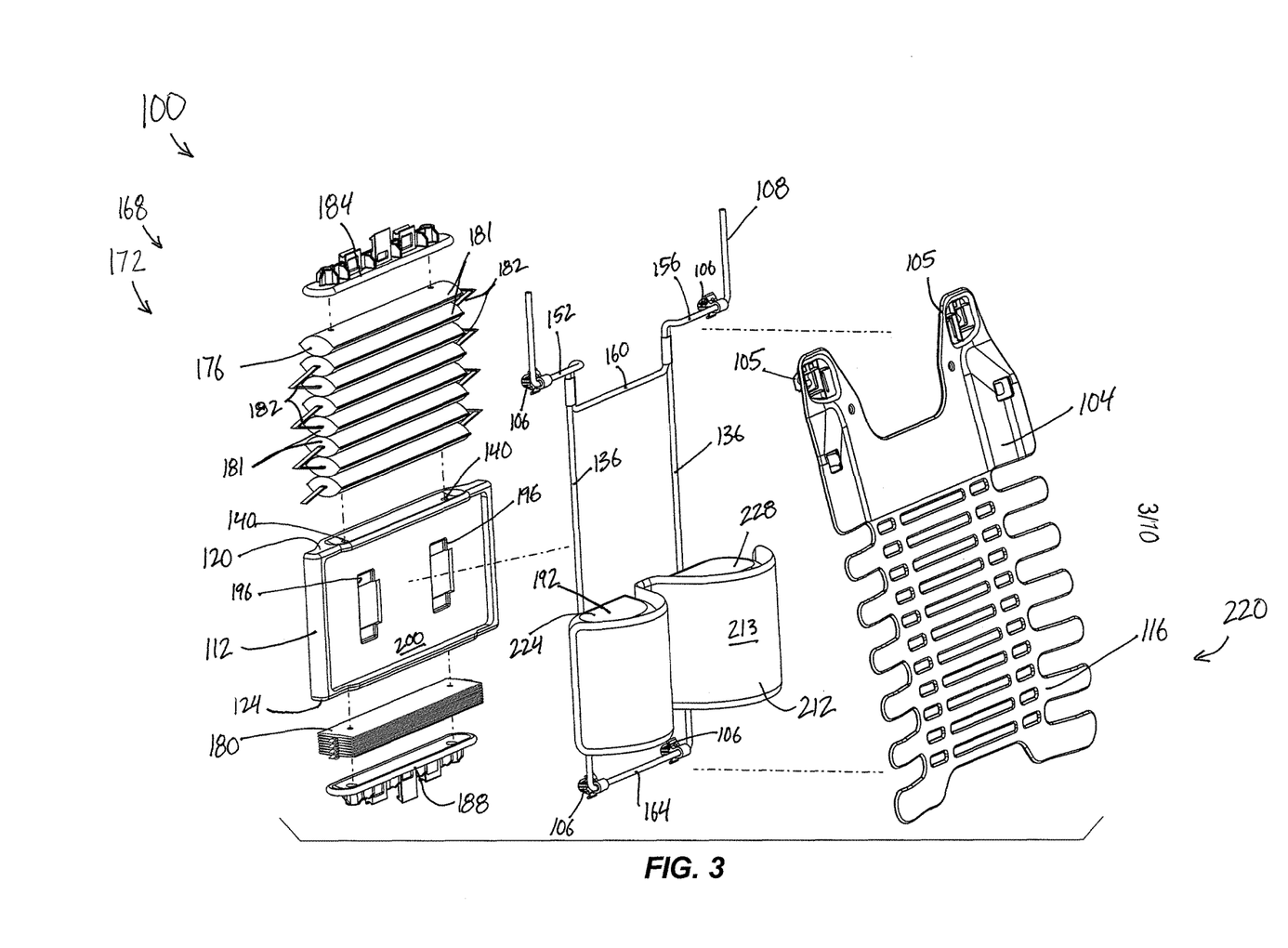
FIG. 3 is an exploded view of the lumbar support system of FIG. 1, with some components removed for clarity.

As shown in FIGS. 1-3, the lumbar support system 100 includes a contour mat 104 (i.e., lumbar basket, lumbar shield, etc.), a guide wire 108, and a carrier 112. The contour mat 104 is adapted to mount to the guide wire 108, and the guide wire 108 is secured to the seat backrest 18. In other words, the guide wire 108 is fixed relative to the seat backrest 18 and frame. In particular, the contour mat 104 is mounted to the guide wire 108 via hooks 105, and the guide wire 108 is secured to the seat frame via fittings 106. The contour mat 104 is positioned overlying the carrier 112 and presents a generally flat front face 116 proximate the seat occupant functioning as a pressure surface against the occupant's lumbar region. Additional cushions, pads, or other materials not shown are situated over and within the seat backrest 18 and between the front face 116 and the seat occupant for added comfort.

The carrier 112 includes a first end 120 and a second end 124 opposite the first end 120 (FIG. 3). As described in greater detail below, the carrier 112 is moveable with respect to the seat backrest 18 along the guide wire 18 in a first direction 128 (e.g., upwards) and in a second direction 132 (e.g., downwards) that is opposite the first direction 128 (FIGS. 4A-4D). The carrier 112 includes a range of motion along the first and second directions 128, 132 of at least 200 mm.

With reference to FIG. 3, the guide wire 108 includes parallel portions 136 that extend along the first direction 128 and the second direction 132. The parallel portions 136 are slidably received within apertures 140 formed in bosses 144 on a backside 148 of the carrier 112 (FIG. 2). The guide wire 108 further includes a first horizontal portion 152, a second horizontal portion 156, a third horizontal portion 160, and a fourth horizontal portion 164. In the illustrated embodiment, the contour mat 104 is mounted via the hooks 105 to the first horizontal portion 152 and the second horizontal portion 156. Alternatively, the contour mat 104 may be mounted to other stationary structure within the seat backrest 18 (e.g., the frame). The first horizontal portion 152 and the second horizontal portion 156 are co-linear, whereas the third horizontal portion 160 and the fourth horizontal portion 164 are spaced apart and parallel.

With continued reference to FIG. 3, the lumbar support system 100 further includes a pneumatic assembly 168 operable to move the carrier 112. The pneumatic assembly 168 includes a bladder assembly 172 that is coupled to the carrier 112. In particular, the bladder assembly 172 includes a first inflatable bladder 176 coupled to the first end 120 of the carrier 112 and a second inflatable bladder 180 coupled to the second end 124 of the carrier 112. A first end cap 184 is coupled to the first bladder 176 and attaches to the third horizontal portion 160 of the guide wire 108. Likewise, a second end cap 188 is coupled to the second bladder 180 and attaches to the fourth horizontal portion 164 of the guide wire 108. As such, the first end cap 184, the second end cap 188, and the guide wire 108 are fixed relative to the seat backrest 18.

Figure 4A:
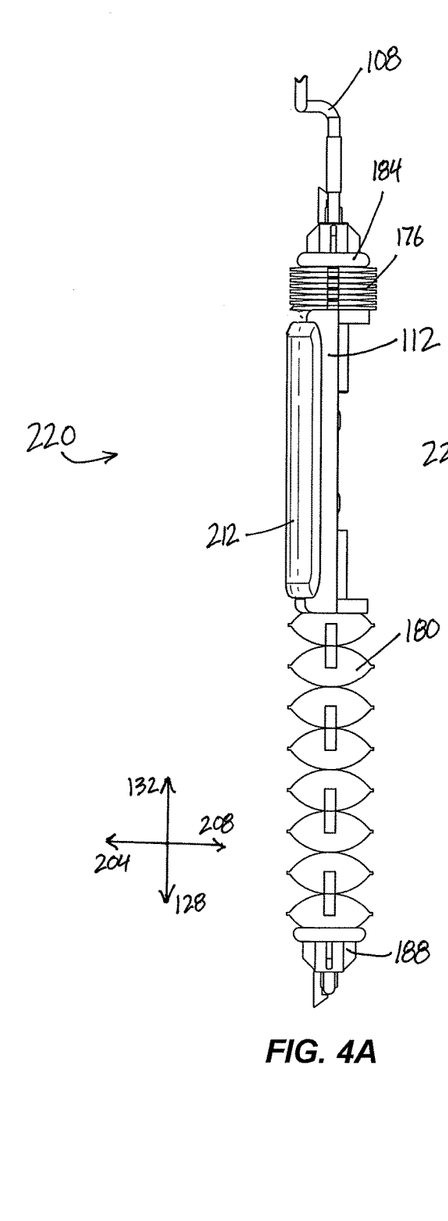
FIG. 4A is a side view of the lumbar support system of FIG. 1, with some components removed for clarity, in a raised and retracted position.
Figure 4B:
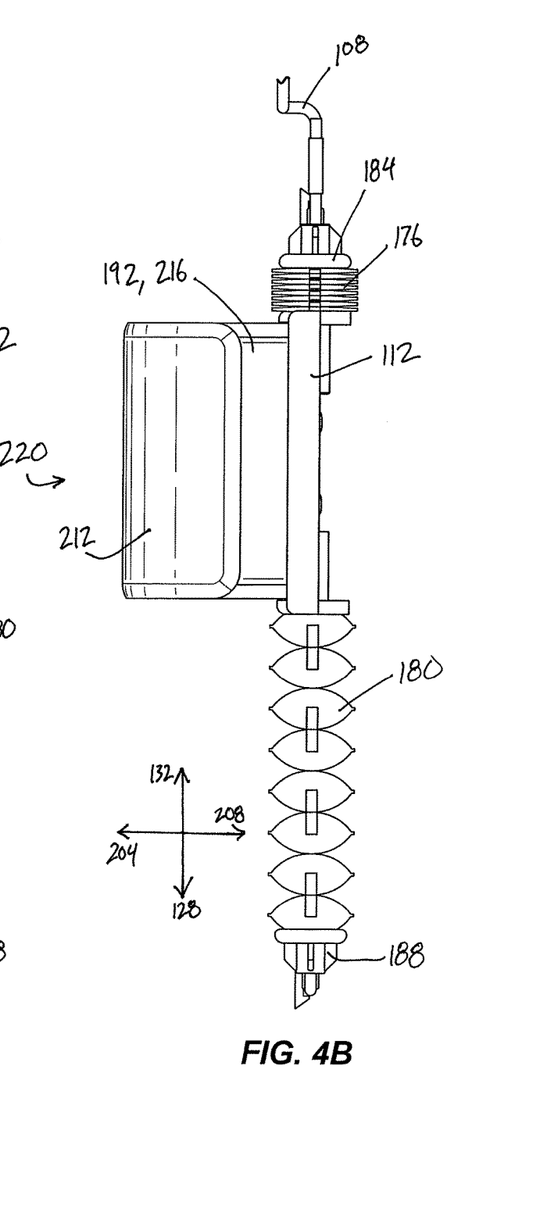
FIG. 4B is a side view of the lumbar support system of FIG. 1, with some components removed for clarity, in a raised and extended position.
Figure 4C:
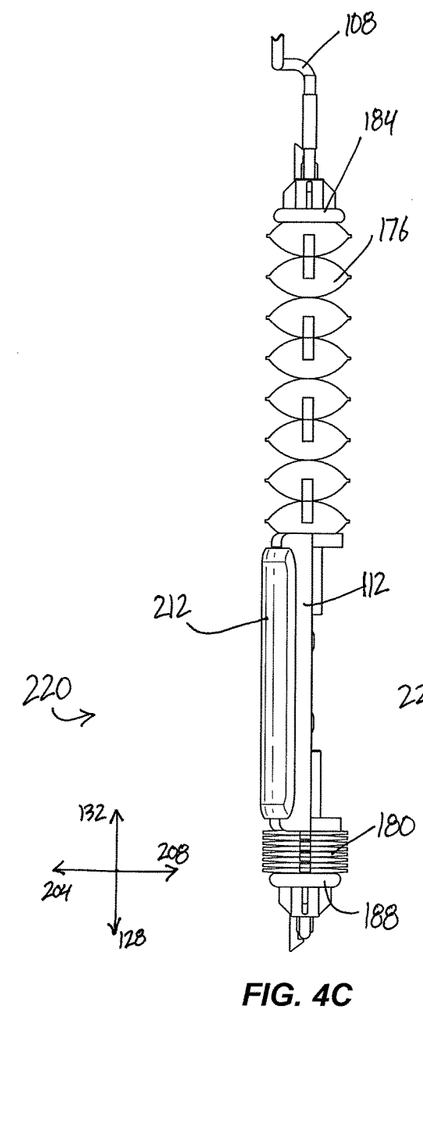
FIG. 4C is a side view of the lumbar support system of FIG. 1, with some components removed for clarity, in a lowered and retracted position.

In addition, the bladder assembly 176 includes a third bladder 192 coupled to the carrier 112. The third bladder 192 overlies a front side 200 of the carrier 112 and is secured to the carrier 112 via clips 196. The third bladder 192 is configured to move with the carrier 112 in the first direction 128 and in the second direction 132. The third bladder 192 is inflatable to move in a third direction 204 (e.g., fore) toward an extended position (FIGS. 4B and 4D) and deflatable to move in a fourth direction 208 (e.g., aft) toward a retracted position (FIGS. 4A and 4C). The third bladder 192 includes a range of motion along the third and fourth directions 204, 208 of at least 60 mm. In the illustrated embodiment, the third direction 204 and the fourth direction 208 are orthogonal to the first and second directions 128, 132. However, in alternative embodiments the third direction 204 and the fourth direction 208 may be non-orthogonal to the first and second directions 128, 132. In the illustrated embodiment, the third bladder 192 includes a first portion 224 and a second portion 228 configured to inflate simultaneously and deflate simultaneously. Although the bladders 176, 180, 192 are shown separated in the exploded view of FIG. 3, the bladders 176, 180, 192 are integrally formed as a single bladder assembly 172, as described in further detail with respect to FIG. 6.

With continued reference to FIGS. 1-3, a shield 212 is positioned overlying an outer surface 216 of the third bladder 192 to protect the third bladder 192 from damage. The shield 212 is operable to move with the third bladder 192 between the extended position and the retracted position. Specifically, a portion of the outer surface 216 of the third bladder 192 moves in the third direction 204 and the fourth direction 208. In other words, the third bladder 192 and the shield 212 are movable with the carrier 112 in the first and second directions 128, 132 (i.e., a first degree of freedom) in addition to being movable in the third and fourth directions 204, 208 (i.e., a second degree of freedom). In the illustrated embodiment, a contact surface 213 the shield 212 (FIG. 3) contacts the contour mat 104 to adjust the contour of the front face 116 with at least two degrees of freedom (i.e., up/down and fore/aft). In alternative embodiments, the contact surface 213 of the shield 212 may directly contact the cushion 26 of the seat backrest 18 without any intervening contour mat 104. In further alternatives, the shield 212 is removed and the third bladder 192 directly contacts the contour mat 104 or cushion 26. In alternative embodiments, the first portion 224 of the third bladder 192 may be configured to inflate or deflate independently of the second portion 228. Such a third bladder 192 with independent side-to-side (i.e., left and right) portions may provide an additional degree of freedom for a user to adjust the lumbar support 220.

For purposes of this description the term "lumbar support" refers generally to the outer surface 216 of the third bladder 192, the shield 212, the contour mat 104, or any combination thereof. The lumbar support is referenced generally with reference numeral 220.

The pneumatic assembly 168 further includes a pneumatic source 232 (i.e., a source of pressurized gas, including air), a first solenoid 236 (see also FIGS. 12A-12B) in fluid communication with the pneumatic source 232, and a second solenoid 240 in fluid communication with the pneumatic source 232. In alternative embodiments, more or fewer than two solenoids may be utilized. In the illustrated embodiment, the pneumatic source 232 includes an air pump 244 (i.e., an air compressor) driven by an electric motor 248. In other words, pneumatic pressure is generated by a dedicated electric motor 248 in the illustrated embodiment. In alternative embodiments, the pneumatic source 232 is any suitable source of compressed air, including a pneumatic module or any pneumatic source within an existing vehicle pneumatic system.

In the illustrated embodiment, the first solenoid 236 is in fluid communication with the first bladder 176 via a first air track 249 and the first solenoid 236 is in fluid communication with the second bladder 180 via a second air track 250. The first air track 249 is formed integrally with the first bladder 176, and the second air track 250 is formed integrally with the second bladder 180. However, the first bladder 176 is not in fluid communication with the second bladder 180. In particular, the first solenoid 236 is a dual-type solenoid operable to connect either the first bladder 176 or the second bladder 180 with the pneumatic source 232. The second solenoid 240 is in fluid communication with the pneumatic source 232 and the third bladder 192. In particular, the second solenoid 240 is a single-type solenoid operable to selectively connect the third bladder 192 to the pneumatic source 232 via a third air track 251. The third air track 251 is formed integrally with the third bladder 192. In the illustrated embodiment, the air tracks 249, 250, 251 are components of the bladder assembly 172.

With reference to FIGS. 4A-4D, the pneumatic assembly 168 is operable to move the lumbar support 220 (i.e., the outer surface 216 of the third bladder 192, the shield 212, the contour mat 104, or any combination thereof) in at least four different directions 128, 132, 204, and 208 extending to and between at least four distinct positions. In other words, the lumbar support 220 is operable to move in four directions 128, 132, 204, and 208, with two degrees-of-freedom. For clarity purposes, the contour mat 104 is not illustrated in FIGS. 4A-4D. In the illustrated embodiments, the four directions 128, 132, 204, and 208 are generally up, down, fore, and aft; however, the four directions can vary depending on the desired application.

With reference to FIG. 4A, the lumbar support 220 is positioned in a raised and retracted position. In particular, the first bladder 176 is deflated, the second bladder 180 is inflated, and the third bladder 192 is deflated. With reference to FIG. 4B, the lumbar support 220 is positioned in a raised and extended position. In particular, the first bladder 176 is deflated, the second bladder 180 is inflated, and the third bladder 192 is inflated. As such, to move between the raised and retracted position of FIG. 4A to the raised and extended position of FIG. 4B, a user activates a fore/aft switch (not shown) to cause the second solenoid 240 to place the third bladder 192 in fluid communication with the pneumatic source 232. In response to the second solenoid 240 fluidly communicating the third bladder 192 with the pneumatic source 232, the third bladder 192 is inflated to move the outer surface 216, the shield 212, and the contour mat 104 toward the extended position (i.e., toward a seat occupant, in the third direction 204). When the extended position of FIG. 4B is reached, the second solenoid 240 seals the third bladder 192 to retain the pressure within the third bladder 192.

To reverse and move between the raised and extended position of FIG. 4B to the raised and retracted position of FIG. 4A, a user activates the fore/aft switch a different direction to cause the second solenoid 240 to place the third bladder 192 in fluid communication with atmosphere. In response to the second solenoid 240 fluidly communicating the third bladder 192 with atmosphere, the third bladder 192 is deflated to move the outer surface 216, the shield 212, and the contour mat 104 toward the retracted position (i.e., away from the seat occupant, in the fourth direction 208). In addition, the user may select to stop the third bladder from inflating or deflating at an intermediate position that is between the extended and retracted position. In this case, the second solenoid 240 seals the third bladder 192 to retain the pressure within the third bladder 192 when the user achieves the desired inflation or deflation. In alternative embodiments, the second solenoid 240 may place the third bladder 192 in fluid communication with any pressure that is less than the pressure contained within the third bladder 192 to deflate the third bladder 192. For example, to deflate the third bladder 192, air pressure from the third bladder 192 may be directed to an auxiliary bladder containing a lower air pressure.

Figure 12A:
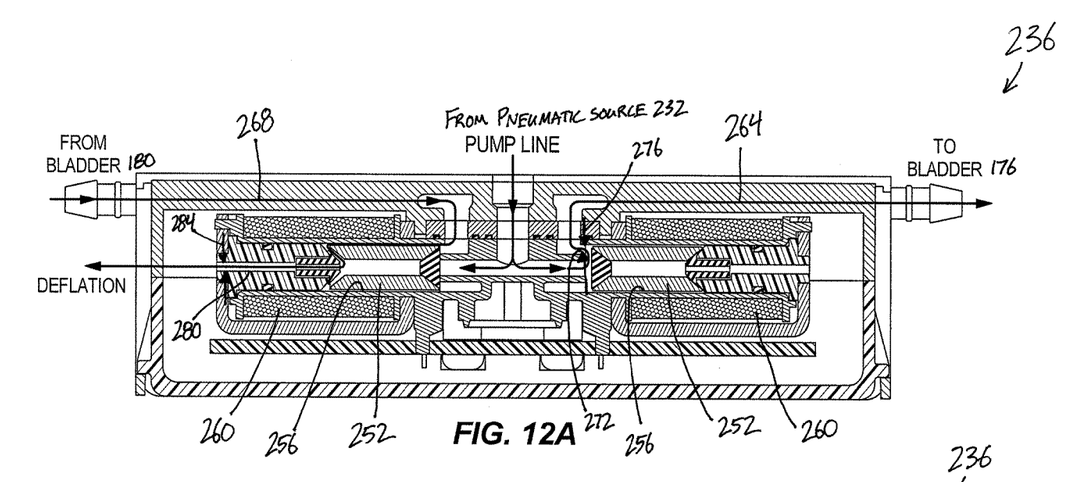
FIG. 12A is a cross-sectional view of a solenoid in fluid communication with the bladder assembly of the lumbar support system of FIG. 1, in a first position.

With reference to FIG. 4C, the lumbar support 220 is positioned in a lowered and retracted position. In particular, the first bladder 176 is inflated, the second bladder 180 is deflated, and the third bladder 192 is deflated. To move between the raised and retracted position of FIG. 4A to the lowered and retracted position of FIG. 4C, a user activates an up/down switch (not shown) to cause the first solenoid 236 to place the first bladder 176 in fluid communication with the pneumatic source 232 (FIG. 12A). In response to the first solenoid 236 fluidly communicating the first bladder 176 with the pneumatic source 232, the first bladder 176 inflates causing the carrier 112, the third bladder 192, and the shield 212 to move in the first direction 128. Simultaneously, as explained in greater detail below, the first solenoid 236 places the second bladder 180 in fluid communication with atmosphere and the second bladder 180 is deflated to move the carrier 112, the third bladder 192, and the shield 212 in the first direction 128. In other words, the first solenoid 236 is controllable to selectively inflate the first bladder 176 while concurrently deflating the second bladder 180.

With reference to FIG. 12A, the first solenoid 236 is a dual-type solenoid with two plungers 252 that are slidable within bores 256 to control the airflow through the first solenoid 236. Specifically, the plungers 252 are repositionable within the bores 256 depending on the energization of electromagnetic coils 260. Energization of the coils 260 is controlled by the user operation of the up/down switch.

With continued reference to FIG. 12A, the first solenoid 236 is shown in a first position with the first bladder 176 in fluid communication with the pneumatic source 232 and the second bladder 180 in fluid communication with atmosphere. In particular, when in the first position, the first solenoid 236 includes an inflating air path 264 for inflating the first bladder 176 and a deflating air path 268 for deflating the second bladder 180. The inflating air path 264 is partially defined by an aperture 272 defining an inflation diameter 276 that is adjustable (e.g., by insertion of different restrictors with various diameters into the aperture 272) to adjust or tune the speed at which the first bladder 176 inflates when connected to the pneumatic source 232. The deflating air path 268 is partially defined by an aperture 280 defining a deflation diameter 284 that is also adjustable (e.g., by insertion of different restrictors with various diameters into the aperture 280) to adjust or tune the speed at which the second bladder 180 deflates when connected to atmosphere. Adjustment of the inflation and deflation speeds can be utilized to, for example, ensure the lumbar support 220 remains adequately supported when transitioning between static positions.

Figure 12B:
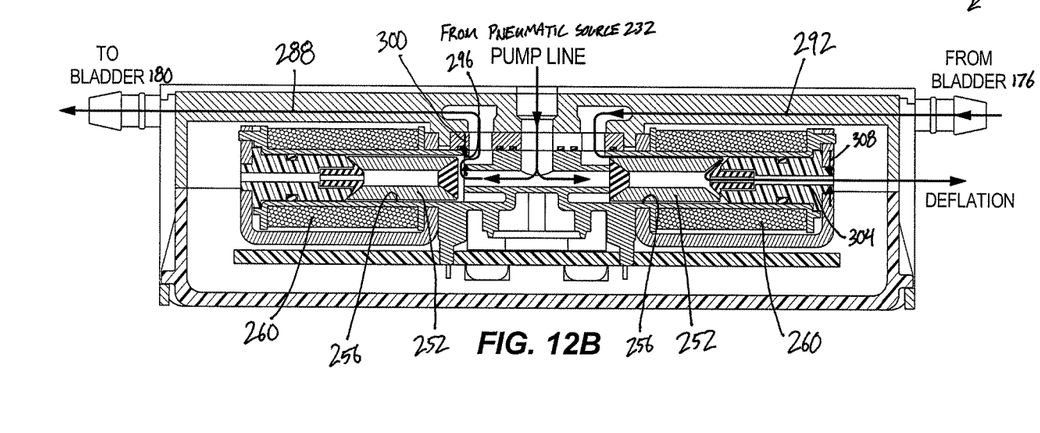
FIG. 12B is a cross-sectional view of the solenoid in fluid communication with the bladder assembly of the lumbar support system of FIG. 1, in a second position.

To reverse and move between the lowered and retracted position of FIG. 4C to the raised and retracted position of FIG. 4A, the user activates the up/down switch in a different direction to cause the first solenoid 236 to place the second bladder 180 in fluid communication with the pneumatic source 232 (FIG. 12B). In response to the first solenoid 236 fluidly communicating the second bladder 180 with the pneumatic source 232, the second bladder 180 inflates causing the carrier 112, the third bladder 192, and the shield 212 to move in the second direction 132. Simultaneously, the first solenoid 236 places the first bladder 176 in fluid communication with atmosphere and the first bladder 176 is deflated to move the carrier 112, the third bladder 192, and the shield 212 in the second direction 132. In other words, the first solenoid 236 is controllable to selectively inflate the second bladder 180 while concurrently deflating the first bladder 176.

With reference to FIG. 12B, the first solenoid 236 is shown in a second position with the second bladder 180 in fluid communication with the pneumatic source 232 and the first bladder 176 in fluid communication with atmosphere. The first solenoid 236 in the second position includes an inflating air path 288 for inflating the second bladder 180 and a deflating air path 292 for deflating the first bladder 176. The inflating air path 288 is partially defined by an aperture 296 defining an inflation diameter 300 that is adjustable (e.g., by insertion of different restrictors with various diameters into the aperture 296) to adjust or tune the speed at which the second bladder 180 inflates when connected to the pneumatic source 232. The deflating air path 292 is partially defined by an aperture 304 defining a deflation diameter 308 that is also adjustable (e.g., by insertion of different restrictors with various diameters into the aperture 304) to adjust or tune the speed at which the first bladder 176 deflates when connected to atmosphere.

With continued reference to FIGS. 12A and 12B, the first solenoid 236 includes the first aperture 272 with the diameter 276 for inflating the first bladder 176 and a second aperture 304 with the diameter 308 for deflating the first bladder 272, and the diameter 276 and the diameter 308 are different. Likewise, the first solenoid 236 also includes the third aperture 296 with the diameter 300 for inflating the second bladder 180 and a fourth aperture 280 with the diameter 284 for deflating the second bladder 180, and the diameter 300 and the diameter 284 are different. In the illustrated embodiment, the inflation diameters 276 and 300 are the same, and the deflation diameters 284 and 308 are the same. However, in alternative embodiments, the diameters may all be individually adjusted.

Figure 4D:
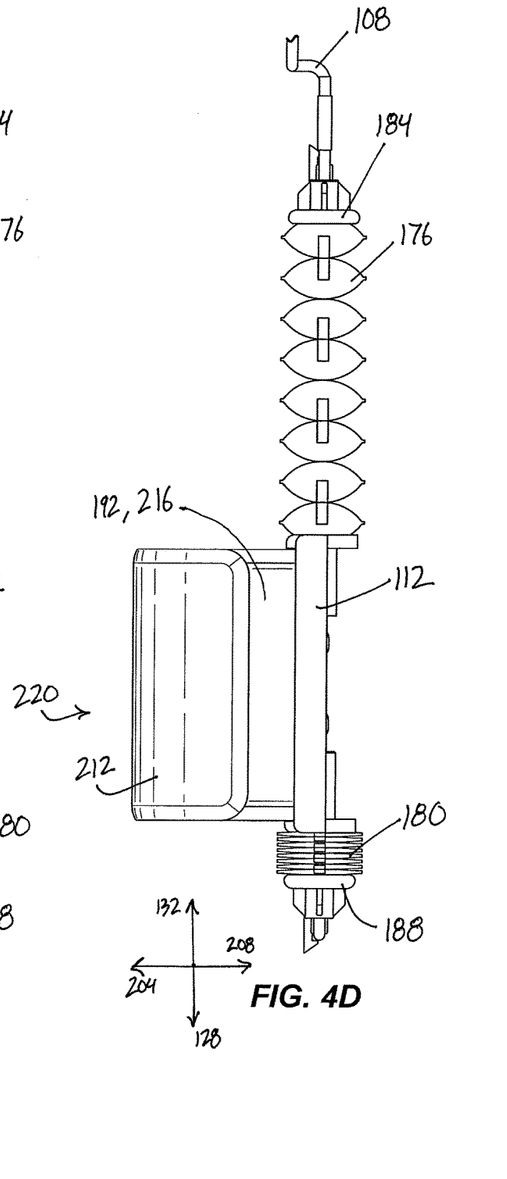
FIG. 4D is a side view of the lumbar support system of FIG. 1, with some components removed for clarity, in a lowered and extended position.

With reference to FIG. 4D, the lumbar support 220 is positioned in a lowered and extended position. In particular, the first bladder 176 is inflated, the second bladder 180 is deflated, and the third bladder 192 is inflated. To move between the lowered and retracted position of FIG. 4C and the lowered and extended position of FIG. 4D, a user activates the fore/aft switch to place the third bladder 192 in fluid communication with the pneumatic source 232 (similar to the description above with respect to the transition between FIG. 4A to FIG. 4B). While only four distinct positions are shown for the lumbar support 220 in FIGS. 4A-4D, the user may adjust the lumbar support 220 such that it is positioned in any intermediate position between the positions shown in FIGS. 4A-4D. For example, the lumbar support 220 may be positioned in an intermediate up/down position between the raised and lowered positions, and may be positioned in an intermediate fore/aft position between the extended and retracted positions. In the illustrated embodiment, the pressure is contained within the bladders 176, 180, 192 when positioned in an intermediate position by the solenoids 236, 240.

As such, the pneumatic source 232 is operable to move the lumbar support 220 in at least four different directions (i.e., up, down, fore, aft), and to do so the lumbar support system 100 does not include any additional electric motors other than the electric motor 248 generating the pneumatic source 232. In some embodiments, the pneumatic pressure is generated without the use of an electric motor, in which case the lumbar support system 100 is operable to move the lumbar support 220 in at least four different directions without the use of any electric motors. Furthermore, the lumbar support system 100 does not include any pressure sensors (e.g., a sensor to measure the pressure within a bladder).

In contrast, conventional pneumatic lumbar assemblies utilize overlapping bladders that require pressure sensors to measure the pressure within the individual, overlapping bladders in order to determine the relative positions of the bladders and to control the adjustment of the bladders. Utilization of pressure sensors also requires a microprocessor to analyze the corresponding pressure sensor signal feedback. The addition of pressure sensors and a microprocessor in conventional pneumatic lumbar assemblies adds complexity, adds cost, and reduces reliability. In addition, conventional mechanical lumbar assemblies require a plurality of electric motors to directly drive mechanical components to achieve multiple degrees of lumbar adjustability, which significantly increases weight, cost, noise, and system complexity. Furthermore, mechanical lumbar assemblies with electric motors require more rigorous testing to ensure safety and reliability as opposed to a pneumatic assembly. In contrast, the pneumatic assembly 100 as described and shown does not require any pressure sensor feedback from individual bladders in order to adjust the lumbar support 220 in at least four directions (e.g., up, down, fore, and aft). Similarly, the pneumatic assembly 168 according to the invention does not require any additional electric motors (except for, in some embodiments, the electric motor 248 generating the pneumatic source 232) in order to adjust the lumbar support 220 in at least four directions (e.g., up, down, fore, and aft).

Figure 5:
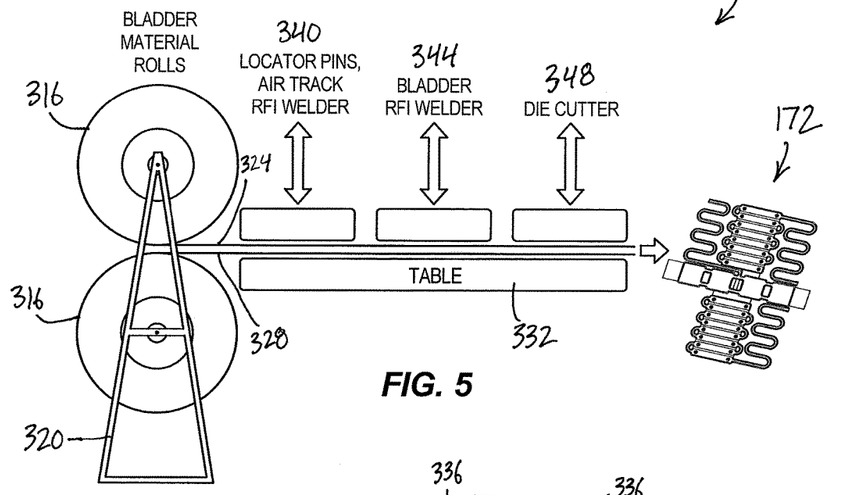
FIG. 5 is a schematic of a process for manufacturing a bladder assembly of the lumbar support system of FIG. 1.
Figure 6:
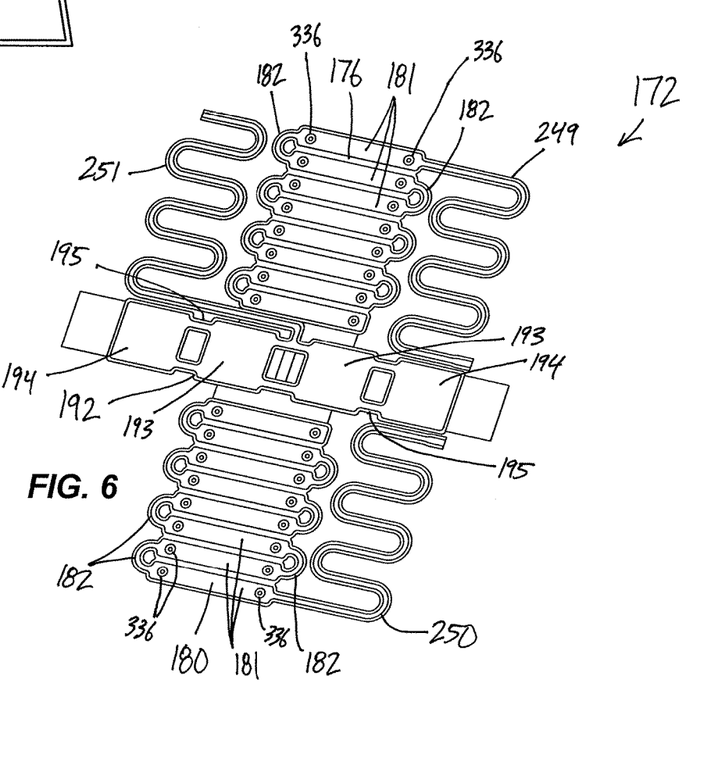
FIG. 6 is a perspective view of a bladder assembly of the lumbar support system of FIG. 1.

With reference to FIGS. 5 and 6, a method 312 of manufacturing the bladder assembly 172 is illustrated. Two rolls of material 316 (e.g., ½ inch thick polypropylene) are supported with a frame 320. The rolls of material 316 are unrolled and a first sheet of material 324 is positioned adjacent to a second sheet of material 328. The two sheets of material 324 and 328 are supported along a table or other surface 332 as they move through the manufacturing process. The method 312 further includes forming the first bladder 176, the second bladder 180, and the third bladder 192 by welding the first sheet of material 324 to the second sheet of material 328. In addition, the first air track 249 (i.e., air inlet/outlet) to the first bladder 176, the second air track 250 to the second bladder 180, and the third air track 251 to the third bladder 192 are formed by welding the first sheet of material 324 to the second sheet of material 328. As such, the air tracks 249, 250, 251 are formed integrally with the bladders 176, 180, 192, eliminating the need for additional tubing and connections at the bladders 176, 180, 192. The integrated air tracks 249, 250, 251 offer improved reliability (i.e., less leakage), less labor, less component cost, thinner package design, and simplified assembly of the lumbar support system 100. In addition, apertures 336 are formed in the first bladder 176 and the second bladder 180 by welding the first sheet of material 324 to the second sheet of material 328, and then removing the center material. The apertures 336 are configured to receive the guide wire 108 and secure the first and second bladders 176, 180 to the guide wire 108.

With continued reference to FIG. 5, the air tracks 249, 250, 251, locator pins, apertures 336, etc. are formed by a welding step 340 and then the bladders 176, 180, 192 are formed by a welding step 344. The welding process may be completed in a single, continuous welding step, or may be welded in stages. In the illustrated embodiment, both of the welding steps 340 and 344 are performed by a radio-frequency induction welding process (i.e., RFI welding). After the welding steps 340, 344 are complete, the excess material surrounding the bladder assembly 172 is removed in a removing step 348 by, for example, a die cutter, resulting in the bladder assembly 172 illustrated in FIG. 6.

With reference to FIG. 6, the unassembled bladder assembly 172 is illustrated with the three bladders 176, 180, 192 and the three air tracks 249, 250, 251. The first bladder 176 and the second bladder 180 are both accordion-type bladders with individual pockets 181, which are in fluid communication with each other by connecting portions 182. The bladder assembly 172 is then folded and assembled within the lumbar support system 100. In some embodiments, the bladder assembly 172 is automatically folded and assembled onto the guide wire 108. In the illustrated embodiment, the method of manufacturing 312 is automated. When assembled, the individual pockets 181 are folded over (i.e., stacked on top of each other). As part of the assembly process, the connecting portions 182, or other portions of the bladder, may become pinched and restrict the airflow between the pockets 181. To prevent such restriction, the connecting portions 182 and other portions of the bladder assembly 172 may include a rib or trough within the air track to ensure adequate flow of air through the pinched area. The third bladder 192 is a bolster-type (i.e., rocker-type) bladder with inner pockets 193 and outer pockets 194 that are in fluid communication with each other by connecting portion 195. The pockets 193, 194 are stacked on top of each other when assembled. In other words, the first portion 224 and the second portion 228 of the third bladder 192 are each formed by one of the outer pockets 194 folded over (i.e., stacked on top of) one of the inner pockets 193.

Figures 7, 8:
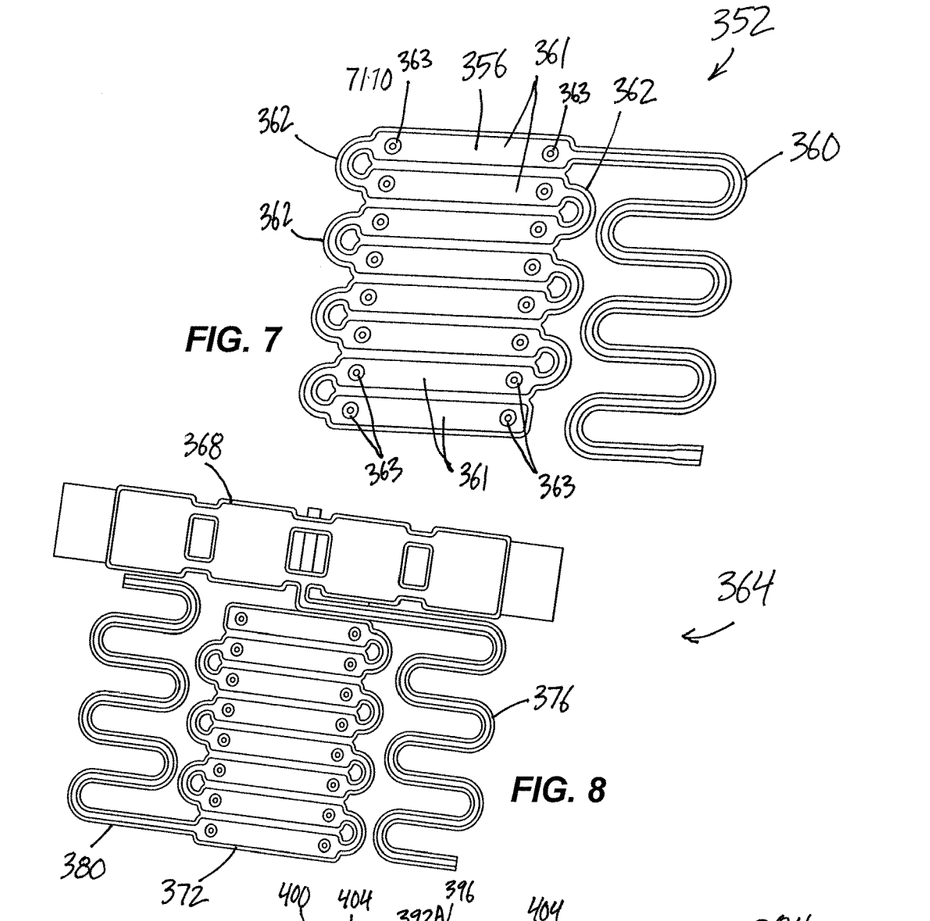
FIG. 7 is a perspective view of a bladder assembly including a bladder and an air track.
FIG. 8 is a perspective view of a bladder assembly including two bladders and two air tracks.

With reference to FIG. 7, a bladder assembly 352 formed by the method of manufacture 312 is illustrated including a single accordion-type bladder 356 and a single air track 360. Similar to the first bladder 176 of FIG. 6, the bladder 356 includes individual pockets 361 in fluid communication with each other via connecting portions 362. In addition, each of the pockets 361 includes two apertures 363 for mounting the bladder 356 on, for example, the guide wire 108. The bladder assembly 352, when assembled, may operate in combination with a spring (not shown) to deflate the single according-type bladder 356.

With reference to FIG. 8, a bladder assembly 364 formed by the method of manufacture 312 is illustrated including two bladders 368, 372 and two air tracks 376, 380. The first bladder 368 is a bolster-type bladder and the second bladder 372 is an accordion-type bladder.

Figure 9:
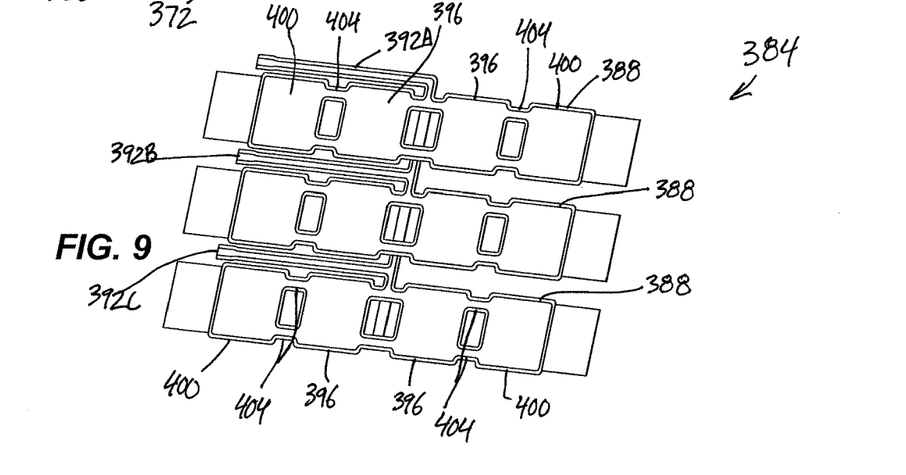
FIG. 9 is a perspective view of a bladder assembly including three bladders and three air tracks.

With reference to FIG. 9, a bladder assembly 384 formed by the method of manufacture 312 is illustrated including three bladders 388 and three air tracks 392A-C. All three bladders 388 are bolster-type (i.e., rocker-type) bladders. Similar to the third bladder 192 of FIG. 6, each of the bladders 388 include inner pockets 396 and outer pockets 400 in fluid communication via connecting portions 404.

Figure 10:
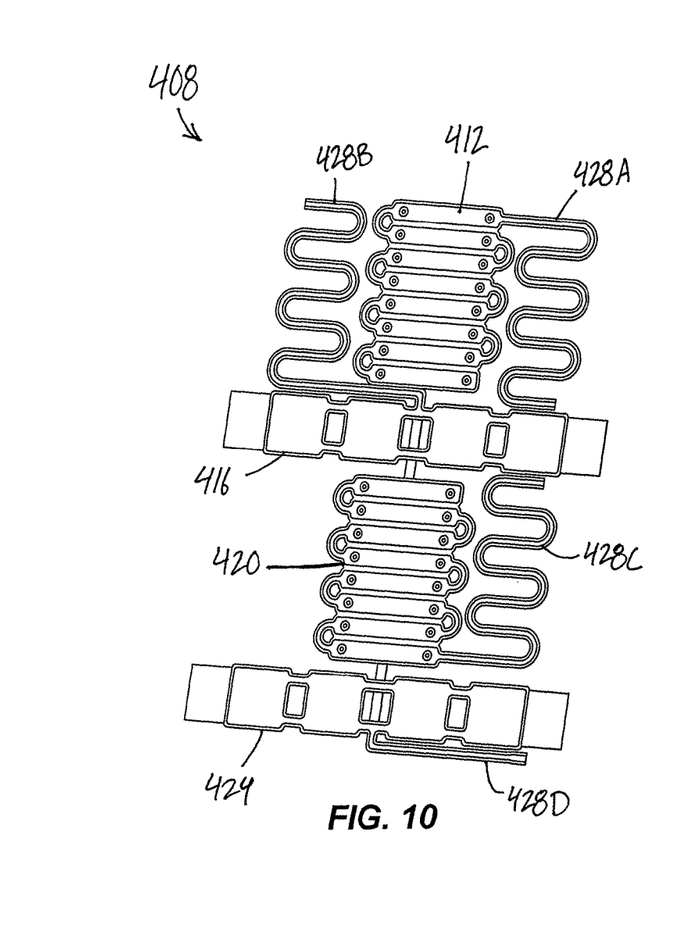
FIG. 10 is a perspective view of a bladder assembly including four bladders and four air tracks.

With reference to FIG. 10, a bladder assembly 408 formed by the method of manufacture 312 is illustrated including four bladders 412, 416, 420, 424 and four air tracks 428A-D. The first bladder 412 and third bladder 420 are accordion-type bladders and the second bladder 416 and the fourth bladder 424 are bolster-type bladders. The fourth bladder 424 can be utilized, for example, to support an occupant's pelvic area so that when the lumbar support moves upwards, the pelvic support does not move back. In other words, the bladder assembly 408 of FIG. 10 includes a 4-way lumbar support, and a pelvic support.

Figure 11:
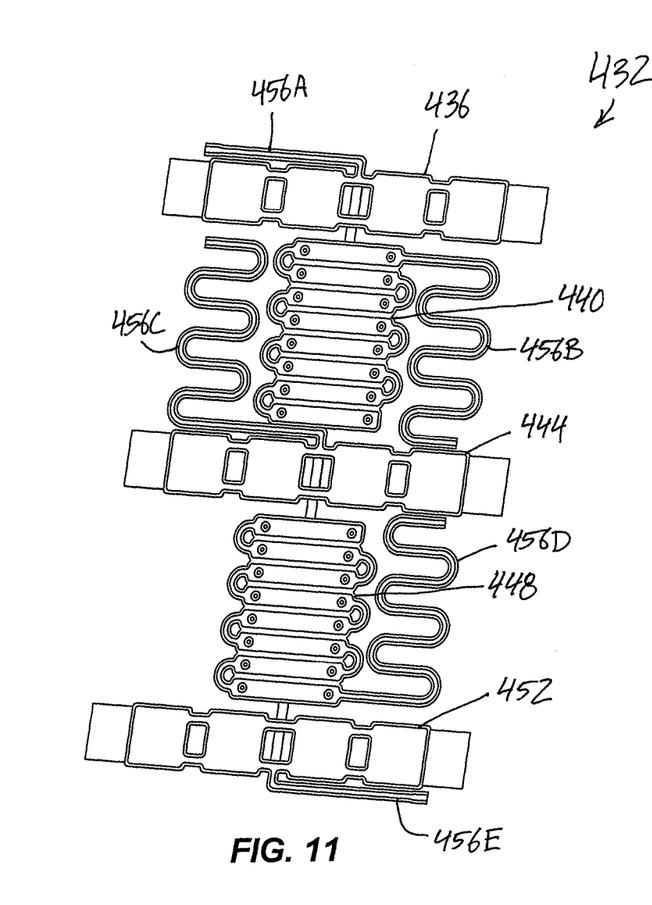
FIG. 11 is a perspective view of a bladder assembly including five bladders and five air tracks.

With reference to FIG. 11, a bladder assembly 432 formed by the method of manufacturing 312 is illustrated including five bladders 436, 440, 444, 448, 452 and five air tracks 456A-E. The first, third, and fifth bladders 436, 444, 452 are bolster-type bladders and the second and fourth bladders 440, 448 are accordion-type bladders. The first bladder 436 can be utilized, for example, to support an occupant's shoulder blade area (i.e., T12 support). In other words, the bladder assembly 432 of FIG. 11 includes a 4-way lumbar support, a pelvic support, and a T12 support.

With reference to FIGS. 6-11, the bladder assemblies may include integrated air tracks that are linear air tracks (for example, the air track 456A of FIG. 11) or that are curved air tracks (for example, the air track 456B of FIG. 11). The curved air tracks are configured to expand (i.e., extend) with movement of the corresponding bladder. For example, the curved air tracks are configured to extend with movement of the carrier 112 in the first and second directions 128, 132.

As illustrated by FIGS. 5-11, a bladder assembly including any number of, and type of, bladders can be formed with integrated air tracks using the method of manufacture 312. The method of manufacture 312 reduces the labor cost associated with conventional manufacturing methods, while allowing for the formation of multi-bladder bladder assemblies (e.g., FIG. 11). The method of manufacture 312 eliminates excessive handling of components and minimizes the potential for human error. In addition, the method of manufacture 312 is easily adjusted to create different bladder assemblies by adjustment of the welder and cutter.

Figure 13:
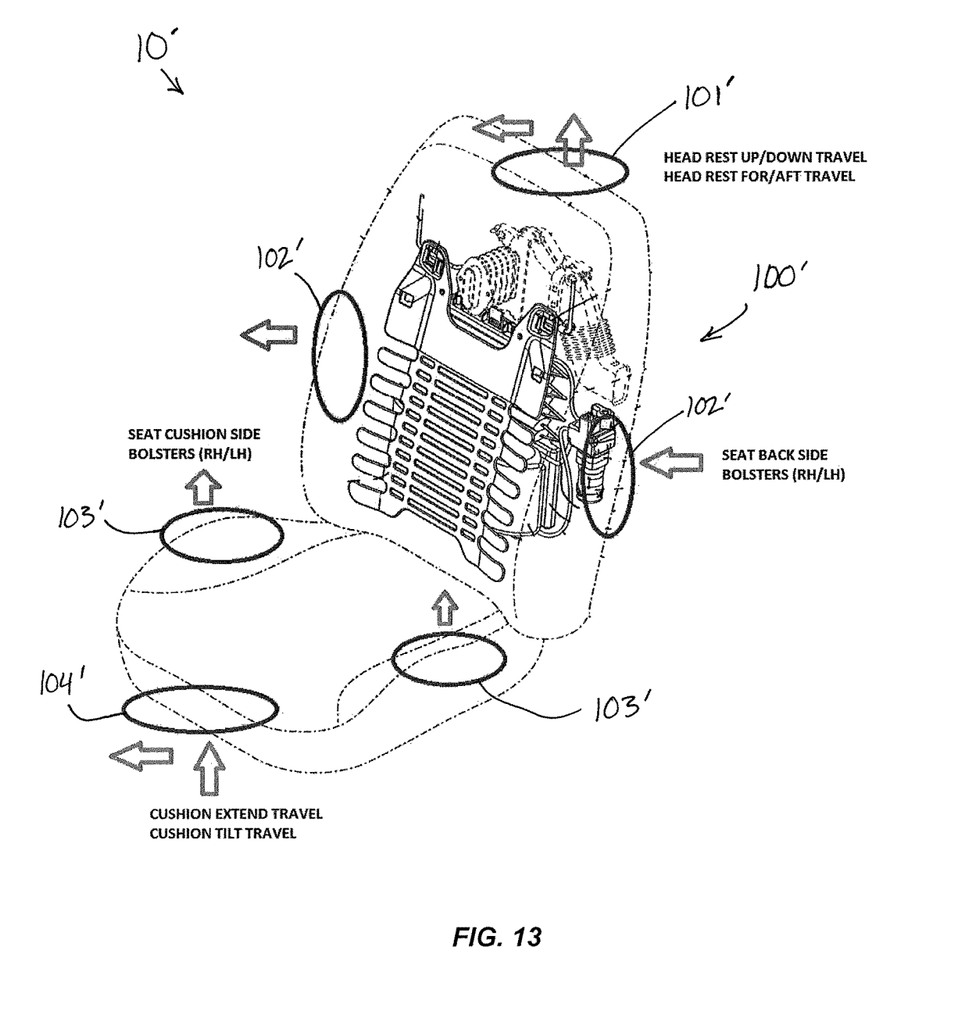
FIG. 13 is a schematic of a vehicle seat with additional adjustment areas, in which similar support systems can be deployed.

Although the bladder assembly 172 has been described in the context of a lumbar support system 100, the bladder assemblies of FIGS. 6-11 can be utilized in any number of various applications including, but not limited to: headrest adjustment, side bolsters, pelvic bolster, shoulder blade bolsters, seat cushion extensions, generic bolsters, etc. With reference to FIG. 13, a seat 10' includes a lumbar support system 100' and a head rest support 101' with up/down and fore/aft adjustability. The seat 10' also includes left-hand and right-hand seat back side bolsters 102'. In addition, the seat 10' includes left-hand and right-hand seat cushion side bolsters 103', and a cushion support 104' with extend/retract and tilt-up/tilt-down adjustability. In other words, the seat 10' includes adjustment areas in addition to the lumbar support in which pneumatic assemblies, similar to the pneumatic assembly 168, can be deployed.

Various features and advantages of the disclosure are set forth in the following claims.

What is claimed is:

1. A lumbar support system for a seat backrest, the lumbar support system comprising:
    a carrier having a first end and a second end opposite the first end, the carrier movable with respect to the seat backrest in a first direction and in a second direction opposite the first direction;
    a first bladder coupled to the first end of the carrier;
    a second bladder coupled to the second end of the carrier;
    a third bladder coupled to the carrier, the third bladder having a contact surface and configured to move with the carrier,
    wherein the first bladder is inflatable to move the carrier in the first direction,
    wherein the second bladder is inflatable to move the carrier in the second direction,
    wherein the third bladder is inflatable such that the contact surface is extendable in a third direction.

2. The lumbar support system of claim 1, wherein the second bladder is deflatable to move the carrier in the first direction, and wherein the first bladder is deflatable to move the carrier in the second direction.

3. The lumbar support system of claim 1, wherein the third direction is orthogonal to the first direction and the second direction.

4. The lumbar support system of claim 1, further comprising a shield positioned overlying the third bladder and operable to move with the contact surface of the third bladder in the third direction.

5. The lumbar support system of claim 1, further comprising a guide wire secured to the seat backrest, wherein the carrier is movable with respect to the seat backrest along the guide wire in the first direction and the second direction.

6. The lumbar support system of claim 1, further comprising a contour mat positioned overlying the carrier.

7. The lumbar support system of claim 1, further comprising a pneumatic source and a solenoid in fluid communication with the pneumatic source.

8. The lumbar support system of claim 7, wherein the solenoid is controllable to selectively inflate one of the first bladder and the second bladder while concurrently deflating the other of the first bladder and the second bladder.

9. The lumbar support system of claim 1, wherein the lumbar support system does not include any pressure sensors.

10. A lumbar support system for a seat backrest, the lumbar support system comprising:
   a lumbar support movable with respect to the seat backrest; and
   a pneumatic assembly configured to provide a pressurized gas generated via an electric motor, the pressurized gas operable to move the lumbar support in at least four different directions, the pneumatic assembly including
      a first solenoid in fluid communication with the pressurized gas,
      a first bladder in fluid communication with the first solenoid, and
      a second bladder in fluid communication with the first solenoid,
   wherein in response to the first solenoid fluidly communicating the first bladder with the pressurized gas, the lumbar support is moved in the first direction,
   wherein in response to the first solenoid fluidly communicating the second bladder with the pressurized gas, the lumbar support is moved in a second direction opposite the first direction, and
   wherein the lumbar support system does not include any additional electric motors other than the electric motor configured to generate the pressurized gas.

11. The lumbar support system of claim 10, wherein the lumbar support system does not include a pressure sensor.

12. The lumbar support system of claim 10, wherein the pneumatic assembly includes
   a second solenoid in fluid communication with the pressurized gas,
   a third bladder in fluid communication with the solenoid,
   wherein in response to the second solenoid fluidly communicating the third bladder with the pressurized gas, the lumbar support is moved in a third direction, and
   wherein in response to the solenoid fluidly communicating the third bladder with atmosphere, the lumbar support is moved in a fourth direction opposite the third direction.

13. A lumbar support system for a seat backrest, the lumbar support system comprising:
   a carrier having a first end and a second end opposite the first end, the carrier movable along a guidewire with respect to the seat backrest in a first direction and in a second direction opposite the first direction;
   a first accordion-type bladder coupled to the first end of the carrier; and
   a second accordion-type bladder coupled to the second end of the carrier,
   wherein the first bladder is inflatable to move the carrier in the first direction, and
   wherein the second bladder is inflatable to move the carrier in the second direction.

14. The lumbar support system of claim 13, further including a third bladder coupled to the carrier, the third bladder configured to move with the carrier and having a contact surface, wherein the third bladder is inflatable such that the contact surface is extendable in a third direction.

15. The lumbar support system of claim 14, wherein the third direction is orthogonal to the first direction and the second direction.

16. The lumbar support system of claim 13, further comprising a pneumatic source and a solenoid in fluid communication with the pneumatic source, wherein the solenoid is controllable to selectively inflate one of the first accordion-type bladder and the second accordion-type bladder while concurrently deflating the other of the first accordion-type bladder and the second accordion-type bladder.

17. The lumbar support system of claim 13, wherein the first accordion-type bladder and the second accordion-type bladder each comprise a plurality of individual pockets, wherein the individual pockets of the first accordion-type bladder are in fluid communication, and wherein the individual pockets of the second accordion-type bladder are in fluid communication.

* * * * *

UNITED STATES PATENT AND TRADEMARK OFFICE
CERTIFICATE OF CORRECTION

PATENT NO. : 10,358,065 B2
APPLICATION NO. : 15/390059
DATED : July 23, 2019
INVENTOR(S) : Robert J. McMillen et al.

Page 1 of 1

It is certified that error appears in the above-identified patent and that said Letters Patent is hereby corrected as shown below:

In the Claims

Column 11, Claim 12, Line 41, insert --second-- before "solenoid,"

Column 12, Claim 12, Line 1, insert --second-- before "solenoid"

Signed and Sealed this
Twentieth Day of July, 2021

Drew Hirshfeld
*Performing the Functions and Duties of the
Under Secretary of Commerce for Intellectual Property and
Director of the United States Patent and Trademark Office*